US012737311B2

(12) United States Patent
Song et al.

(10) Patent No.: US 12,737,311 B2
(45) Date of Patent: Sep. 15, 2026

(54) EMBEDDED-ORIENTED CONFIGURABLE MANY-CORE PROCESSOR

(71) Applicants: BEIJING MICROELECTRONICS TECHNOLOGY INSTITUTE, Beijing (CN); BEIJING MXTRONICS TECHNOLOGY CO., LTD, Beijing (CN)

(72) Inventors: Liguo Song, Beijing (CN); Lei Chen, Beijing (CN); Liang Wang, Beijing (CN); Hui Qin, Beijing (CN); Chunxue Liu, Beijing (CN); Hongchao Zheng, Beijing (CN); Xiao Bi, Beijing (CN); Tongde Li, Beijing (CN); Chunqing Yu, Beijing (CN)

(73) Assignees: BEIJING MICROELECTRONICS TECHNOLOGY INSTITUTE, Beijing (CN); BEIJING MXTRONICS TECHNOLOGY CO., LTD, Beijing (CN)

( * ) Notice: Subject to any disclaimer, the term of this patent is extended or adjusted under 35 U.S.C. 154(b) by 359 days.

(21) Appl. No.: 18/682,893

(22) PCT Filed: Sep. 10, 2021

(86) PCT No.: PCT/CN2021/117738
§ 371 (c)(1),
(2) Date: Feb. 9, 2024

(87) PCT Pub. No.: WO2023/015656
PCT Pub. Date: Feb. 16, 2023

(65) Prior Publication Data

US 2024/0281395 A1 Aug. 22, 2024

(30) Foreign Application Priority Data

Aug. 12, 2021 (CN) ......................... 202110924960.7

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ...................................................... G06F 13/28
(Continued)

(56) References Cited

U.S. PATENT DOCUMENTS

2012/0089985 A1* 4/2012 Adar .................. G06F 11/3466 712/228
2016/0162017 A1* 6/2016 Henry ...................... G06F 1/32 713/324

(Continued)

FOREIGN PATENT DOCUMENTS

CN 102063408 A 5/2011
CN 102591759 A 7/2012

(Continued)

OTHER PUBLICATIONS

Song, Liguo; Hu, Chengxiu; Qi, Hongliang, "Heterogeneous multi-core SoC architecture exploration of SAR radar digital system", Dec. 31, 2017, p. 50-p. 56.

(Continued)

*Primary Examiner* — Titus Wong
(74) *Attorney, Agent, or Firm* — The Sun IP Law

(57) ABSTRACT

An embedded-oriented configurable many-core processor is disclosed, which includes: an on-chip data-bus system, an on-chip event-bus system, a data connection line, a routing unit and a core. The on-chip data-bus system includes multiple transverse data-bus and vertical data-bus. The multiple transverse data-bus and vertical data-bus are staggered transversely and vertically to form N intersections, each intersection of the N intersections is correspondingly pro- (Continued)

vided with a routing unit, and adjacent routing units are connected by transverse data-bus or vertical data-bus. The on-chip event-bus system includes: an event control unit, an event bus and an event signal line. Each event control unit is connected with the event bus, and is connected with the corresponding core and routing unit through the event signal line.

7 Claims, 3 Drawing Sheets

(58) Field of Classification Search
USPC ............................................................ 710/22
See application file for complete search history.

(56) References Cited

U.S. PATENT DOCUMENTS

| | | | | |
|---|---|---|---|---|
| 2018/0089139 | A1* | 3/2018 | Hutton | G06F 15/7867 |
| 2019/0158428 | A1* | 5/2019 | Gray | H04L 47/2483 |
| 2019/0340020 | A1* | 11/2019 | Brewer | G06F 9/3806 |
| 2021/0357356 | A1* | 11/2021 | Brewer | G06F 15/82 |
| 2022/0214913 | A1* | 7/2022 | Leyrer | G06F 9/52 |

FOREIGN PATENT DOCUMENTS

| | | | |
|---|---|---|---|
| CN | 107562549 | A | 1/2018 |
| CN | 110096475 | A | 8/2019 |
| CN | 110347635 | A | 10/2019 |
| CN | 112650705 | A | 4/2021 |
| WO | 2016159765 | A1 | 10/2016 |

OTHER PUBLICATIONS

Wang, Jian; Zhang, Lei; Wang, Shaoxuan; Zhao, Zhonghui; Chen, Yaning, “Research of High Speed Communication Architecture about Inter-core of Multi-core Processors”, Jun. 20, 2011, p. 41-p. 48.

Zheng, Fang; Xu, Yong; Li, Hongliang; Xie, Xianghui; Chen, Zuoning, “A homegrown many-core processor architecture for high-performance computing”, Apr. 20, 2015, p. 523-p. 534.

Zhang, Kexin; Chu, Yifeng, “Design of Distributed Storage Multi-Core System Based on NoC Architecture”, May 18, 2020, p. 905-p. 908.

The First Search Report of the counterpart CN application No. 202110924960.7 issued on Mar. 19, 2024.

* cited by examiner

EMBEDDED-ORIENTED CONFIGURABLE MANY-CORE PROCESSOR

The disclosure claims priority to Chinese Patent Application No. 202110924960.7 filed to the China National Intellectual Property Administration on Aug. 12, 2021 and entitled "Embedded-Oriented Configurable Many-Core Processor", the disclosure of which is hereby incorporated by reference in its entirety.

TECHNICAL FIELD

The disclosure belongs to the technical field of processor design, in particular to an embedded-oriented configurable many-core processor.

BACKGROUND

A many-core processor chip is integrated with multiple cores, aiming at providing ultra-high computing performance through aggregation of operational units. In 1994, Stanford's research team first proposed the concept of on-chip multi-core. The design of an embedded multi-core/many-core chip started from 1990s at home and abroad. At present, the representative products are Shenwei many-core processor 26010, General Purpose Graphics Processing Unit (GPGPU), PC202, RAW and CELL.

(1) For the Shenwei many-core processor 26010, an on-chip heterogeneous architecture and a unified instruction set system are employed, four control cores and 256 operational cores are integrated, and the Shenwei many-core processor 26010 is a combination of multi-core and many-core structures. In fact, the Shenwei many-core processor 26010 integrates four independent core sets, each core set contains a control core and 64 computing cores, the core set has independent memory space, and the bandwidth is completely exclusive.

(2) For the GPGPU, the computing core is a simple computing component, and multiple cores are organized in groups or clusters, which may provide powerful parallel computing capability through data stream parallelism such as single instruction multi-thread mechanism. The thread in the GPGPU is an ultra-lightweight thread managed automatically by hardware, so it takes almost no overhead to switch threads on the GPGPU. When a GPGPU thread is suspended for memory access, the hardware can immediately switch to another ready thread to continue to compute different data elements. For an disclosure with high computing density, the memory access delay may be effectively hidden by multiple concurrent Graphic Processing Unit (GPU) threads. Main typical products include NVIDIA's GPGPU series processors, such as Fermi and Kepler, and AMD's GPU series, etc.

(3) For the PC202: the PC202 is a large-scale parallel array processing device developed by Pico-Chip Company in Britain, adopts a multi-instruction multi-data mechanism, and belongs to a heterogeneous array processor. Since the mechanism is optimized for a high-performance wireless communication digital signal processing algorithm, all physical layer signal processing and control in mobile communication may be implemented through software. The PC202 integrates 248 cores which are connected by a determined high-speed interconnection bus. Since the processor cores can operate in parallel or connect with each other, super processing power is provided.

(4) For the RAW, a reconfigurable RAW processing chip researched by Massachusetts Institute of Technology (MIT) connects dozens of very simple processing units through routing units on a single chip. The processor is a highly parallel architecture in design. Interconnection bus inside and between the units are very short, which fully supports pipeline parallelism. An important feature of the RAW lies in an operation of reading the register before an instruction is executed. In addition to an operand that is conventionally taken out of the register and an operand that is just computed from a functional unit, there is also an operand that is transmitted from a neighboring processing unit through the routing network. The mechanism couples the functional units of multiple processing units together to form a parallel complex processing system.

(5) For the CELL: The CELL is a high-performance processing chip jointly developed by International Business Machines Corporation (IBM), Sony and Toshiba. The CELL consists of a relatively simple dual-issue 64-bit PowerPC kernel (called PPE) that supports simultaneous dual-thread parallelism and eight Single Instruction Multiple Data (SIMD) vector coprocessors (called SPE). On-chip, there is a high-bandwidth ring structure bus that connects the PowerPC kernel, the vector coprocessor, RAMBUS, a memory interface controller and a Flex input/output bus interface controller. The PowerPC kernel is mainly responsible for controlling and executing an operating system, and the vector coprocessor s are responsible for main computing tasks.

However, the research of the above-mentioned many-core processor products focuses on effective integration through an on-chip bus, but there are some shortcomings in the following two aspects.

(1) Lack of a fast hardware synchronization mechanism. At present, the cores of the many-core processor usually needs to send a special kind of synchronization package through issuing an instruction, and synchronization information of each core is attached to the package. A synchronization control module receives all of synchronization packages, and returns a successful synchronization signal to the core that need to be synchronized in a same synchronization event. This method of soft synchronization using the synchronization package is inefficient, and is not suitable for an embedded system with high real-time requirements.

(2) Lack of flexible data movement and lack of the ability of definition of on-chip memory space. The existing many-core processor only achieves the mutually access between the cores in the chip and the cores can directly access main memory space, neither support software definition of on-chip memory space not support efficient data transmission between memory space and cores.

SUMMARY

The problem of the disclosure is to overcome the shortcomings of a conventional art and provide an embedded-oriented configurable many-core processor, which may meet the requirements of embedded application, such as: fast synchronization capability, concurrent communication capability, high real-time and high throughput performance.

In order to solve the above problem, at least some embodiments of the disclosure discloses an embedded-oriented configurable many-core processor, which may include: an on-chip data-bus system, an on-chip event-bus system, a data connection line, N routing units and N cores.

The on-chip data-bus system may include: multiple transverse data-bus and multiple vertical data-bus. The multiple transverse data-bus and the multiple vertical data-bus are staggered transversely and vertically to form N intersections, each intersection is correspondingly provided with a routing unit, and adjacent routing units are connected by transverse data-bus or vertical data-bus.

The on-chip event-bus system may include: N event control units, an event bus and an event signal line.

One core corresponds to one routing unit and one event control unit. Each core of the N cores is connected with the corresponding routing unit through the data connection line. On the one hand, each event control unit being connected with the event bus, and the each event control unit being connected with the corresponding core and routing unit through the event signal line on the other hand, and the event control unit is configured to implement signal gating and logical connection between the event bus and the event signal line.

In the embedded-oriented configurable many-core processor, the transverse data line, the vertical data-bus and the data connection lines are all bidirectional data lines including an input and an output.

In the embedded-oriented configurable many-core processor, the event bus is a set of signal lines transmitting signals, each signal line transmitting pulse signals representing different meanings, and each pulse signal representing different meanings is called an event.

In the embedded-oriented configurable many-core processor, the each core of the N cores may include: an input event register, an output event register, a control logic unit, a first memory unit, an operational logic unit and a network interface unit.

The network interface unit being matched with the corresponding routing unit of current core, and the network interface unit includes: an input-message-analysis-module and an output-message-analysis-module.

An input of the input event register being connected with an output of the corresponding event control unit of the current core, and the output of the input event register is connected with the input of the control logic unit.

The output of the control logic unit is respectively connected with the input of the first memory unit and the input of the operational logic unit.

The first memory unit is connected with the operational logic unit through the bidirectional data line.

The input of the output event register being connected with the output of the operational logic unit, and the output of the output event register is connected with the input of the corresponding event control unit of the current core.

The input of the input-message-analysis-module is connected with the output of the corresponding routing unit of the current core, and the output of the input-message-analysis-module being connected with the input of the operational logic unit.

The input of the output-message-analysis-module is connected with the output of the operational logic unit, and the output of the output-message-analysis-module being connected with the input of the corresponding routing unit of the current core.

In the embedded-oriented configurable many-core processor, the input event register is configured to register the output of the corresponding event control unit of the current core.

The control logic unit is configured to decode an instruction executed by the current core, and generate and output a first control signal for completing each operation to be executed by each instruction.

The first memory unit is configured to temporarily store the first control signal and to-be-processed data and/or processed data.

The operational logic unit is configured to execute corresponding arithmetic operation and/or logic operation based on the output of the control logic unit, the output of the input-message-analysis-module and the output of the first memory unit, and output an operational result of the arithmetic operation and/or logic operation to the output-message-analysis-module, the first memory unit and the output event register.

The network interface unit is configured to assemble and analyze message data between the current core and the corresponding routing unit.

The input-message-analysis-module is configured to analyze the message data transmitted through the routing unit, judge whether the message data is a message for the current core, in response to the message data being the message for the current core, remove a header of the message data, obtain effective data by extraction, and send the effective data to the operational logic unit. The output-message-analysis-module is configured to assemble a operational result output by the operational logic unit based on a specified message format and then output the operational result after assembly to the routing unit.

The output event register is configured to register the output of the operational logic unit.

In the embedded-oriented configurable many-core processor, the event bus may include: a set of forward event bus for unidirectional transmission and a set of reverse event bus for unidirectional transmission. The transmission directions of the forward event bus and the reverse event bus are opposite, and the forward event bus and the reverse event bus are respectively composed of K signal lines.

The event signal line may include: P output event signal lines and Q input event signal lines.

In the embedded-oriented configurable many-core processor, the event control unit may include: L output configuration registers, L' input configuration registers and J*(L+L') transmission gates. J transmission gates are a set, totaling (L+L') sets of transmission gates, and a set of transmission gates corresponds to an output configuration register or an input configuration register.

Each output configuration register being respectively connected with control terminals of the J transmission gates in the corresponding set of transmission gates through J leads.

Each input configuration register being respectively connected with the control terminals of the J transmission gates in the corresponding set of transmission gates through the J leads.

Input terminals of the J transmission gates in the corresponding set of transmission gates of the output configuration register being respectively connected with K signal lines of the forward event bus and K signal lines of the reverse event bus, and output terminals of the J transmission gates in the corresponding set of transmission gates of the output configuration register being respectively connected with a corresponding output event signal lines, that is, J=2K, P=L.

The output terminals of the J transmission gates in the corresponding set of transmission gates of the input configuration register being respectively connected with K signal lines of the forward event bus and K signal lines of the reverse event bus, and the input terminals of the J transmission gates in the corresponding set of transmission gates of the input configuration register being respectively connected with corresponding input event signal lines, that is, Q=L'.

In the embedded-oriented configurable many-core processor, the routing unit may include: a routing configuration table, a first configuration register, a second configuration register, a third configuration register, a second memory unit, a message assembly module, a static routing module, a dynamic routing module, a routing unit input data line, a routing unit output data line, a routing input event signal line and a routing output event signal line.

The routing unit input data line may include: five Direct Memory Access (DMA) input data lines in up, down, left, right and processor-core directions, and five variable input data lines in the up, down, left, right and processor-core directions.

The routing unit output data line may include: five DMA output data lines in the up, down, left, right and processor-core directions, and five variable output data lines in the up, down, left, right and processor-core directions.

The static routing module may include: message analysis modules I to V, a first crossbar logic unit, multiplexers I to V and a five-way selector. The input of each message analysis module being respectively connected with the output of the routing configuration table and a corresponding DMA input data line. The output of each message analysis module being respectively connected with one way of input of the first crossbar logic unit and one way of input of the five-way selector. The output of the five-way selector respectively connected to the input of the second memory unit. Five outputs of the first crossbar logic unit being respectively connected with the inputs of the multiplexers I to V. The five DMA output data lines being respectively connected with the outputs of the multiplexers I to V. The output of the first configuration register is connected with the input of the first crossbar logic unit. The output of the second configuration register being respectively connected with the control terminals of the multiplexers I to V.

The dynamic routing module may include: a message analysis module VI, first-in-first-out units I to V, a second crossbar logic unit and multiplexers VI to X. The input of the message analysis module VI being respectively connected with the routing configuration table and the outputs of the first-in-first-out units I to V. The output of the message analysis module VI is connected with the input of the second crossbar logic unit. The input of each first-in-first-out unit being respectively connected with a corresponding variable input data line. The output of each first-in-first-out unit being respectively connected with the input of the message analysis module VI and one way of input of the second crossbar logic unit. Six ways of outputs of the second crossbar logic unit being respectively connected with the input of the second memory unit and the inputs of the multiplexers VI to X. The five variable output data lines being respectively connected with the outputs of the multiplexers VI to X. The output of the third configuration register being respectively connected with the control terminals of the multiplexers VI to X.

The output of the message assembly module being respectively connected with the inputs of the multiplexers I to X.

The second memory unit being respectively connected with the output of the five-way selector, the input of the message assembly module, one way of output of the second crossbar logic unit, the routing input event signal line and the routing output event signal line.

In the embedded-oriented configurable many-core processor, the static routing module, configured to control a DMA data stream transmission path.

The dynamic routing module, configured to control variable data transmission.

The routing configuration table, configured to store a correspondence between physical coordinates and logical coordinates of the routing unit, and a correspondence between address space and the logical coordinates of the routing unit, for using in routing arbitration selection.

The first configuration register, configured to preset the correspondence between the five outputs and the five inputs of the first crossbar logic unit.

The second configuration register, configured to control output selection of the multiplexers I to V.

The message analysis modules I to V are sequential logic modules, configured to analyze the message input to the routing unit to obtain a message analysis result, judge; based on the message analysis result, the type of the message input to the routing unit to determine whether the message input to the routing unit is DMA data stream transmission or DMA variable transmission; judge a destination address of the message input to the routing unit according to the message analysis result and the correspondence stored in the routing configuration table to determine whether the destination address of the message input to the routing unit matches the current routing unit or needs to be continuously transmitted along a route; continuously transmit the message along the route determine the output connection between the message analysis modules I to V and the first crossbar logic unit to be valid in response to the message input to the routing unit being the DMA data stream and the destination address of the message does not match the current routing unit; and determine the output connection between the message analysis modules I to V and the five-way selector to be valid in response to the message input to the routing unit being the DMA data stream, and the destination address of the message does not match the current routing unit.

The first crossbar logic unit is a combinatorial logic module, configured to establish a cross transmission path between the five inputs and the five outputs of the first crossbar logic unit. That is, any output of the first crossbar logic unit is capable of communicating with any input.

The message analysis module VI is a sequential logic module, configured to analyze the messages output through the first-in-first-out units I to V in sequence based on set priority, output a routing direction arbitration signal, and take the routing direction arbitration signal as the control signal of the second crossbar logic unit to make the messages read by the first-in-first-out units I to V can continue to be transmitted.

The second crossbar logic unit is a combinatorial logic module, configured to establish a cross transmission path between the five inputs and the five outputs of the second crossbar logic unit. That is, any output of the second crossbar logic unit is capable of communicating with any input.

The second memory unit, configured to temporarily store the DMA data and variable data input from the up, down, left, right and processor-core directions, and serves as a shared memory for the core to access.

The message assembly module is a sequential logic module, configured to assemble the data read from the second memory unit into a message that may be transmitted in the routing unit of the many-core processor according to a set rule and format.

The third configuration register, configured to control the multiplexers VI to X to perform selection between the message assembly module and one way of output of the second crossbar logic unit.

The disclosure has the following advantages.

(1) The many-core processor can be configured that matching application. These configurations are implemented by multiple configuration registers, which can configure a synchronization relationship of the many-core processor, shared memory space and a data stream transmission path. Through configuration and reshaping of the internal structure of the many-core processor, the disclosure forms an optimal matching structure for a current disclosure program, and achieves the purposes of high performance and low power consumption.

(2) The disclosure discloses the embedded-oriented configurable multi-core processor, in which events achieve fast synchronization function among cores. The event may not only represent the validity of incoming data and the end of a processing task, but also represent an external trigger signal, a timer trigger signal, a counter trigger signal, etc. The cores can not only send the event, but also receive and judge the event. The cores can not only receive at least one event, but also send the at least one event. Since the signal lines carrying the event can span multiple cores and establish communication among the multiple cores, the synchronization mode adopted through the disclosure is more direct and efficient.

(3) The disclosure discloses the embedded-oriented configurable many-core processor, in which the internal routing unit integrates the memory units, and a flexible on-chip distributed shared memory system is formed along with an on-chip routing system. The on-chip distributed shared memory system can support capacity dynamic partitioning and grouping through pre-definition and configuration. Since there is no coupling between the shared memory system and the cores, the impact of accessing the shared memory space between cores is eliminated. The disclosure adopts a method of combining software and hardware, so that the on-chip memory management is flexible, and reconfigurable local data memory space is implemented.

(4) The disclosure discloses the embedded-oriented configurable many-core processor. The internal routing unit integrates two functions of static routing supporting DMA data stream transmission and dynamic routing supporting variable transmission to support flexible data movement. The static routing ensures the transmission of a high throughput data stream. During transmission, it is not necessary to judge the routing direction, and transmission is directly carried on according to a pre-configured direction. The dynamic routing ensures the transmission of low-delay and lightweight data. During transmission, the routing direction is automatically judged based on a package header, which simplifies the difficulty in development of high-level disclosure software. Since the memory unit is integrated in the routing unit, the static routing may be implemented to write DMA data into the memory unit, and then multicast to different cores through a dynamic routing system, and the multiple cores may also be implemented to write data into the memory units in the routing unit, and then read the data from the memory for transmission through the static routing.

DETAILED DESCRIPTION OF THE EMBODIMENTS

Figure 1:
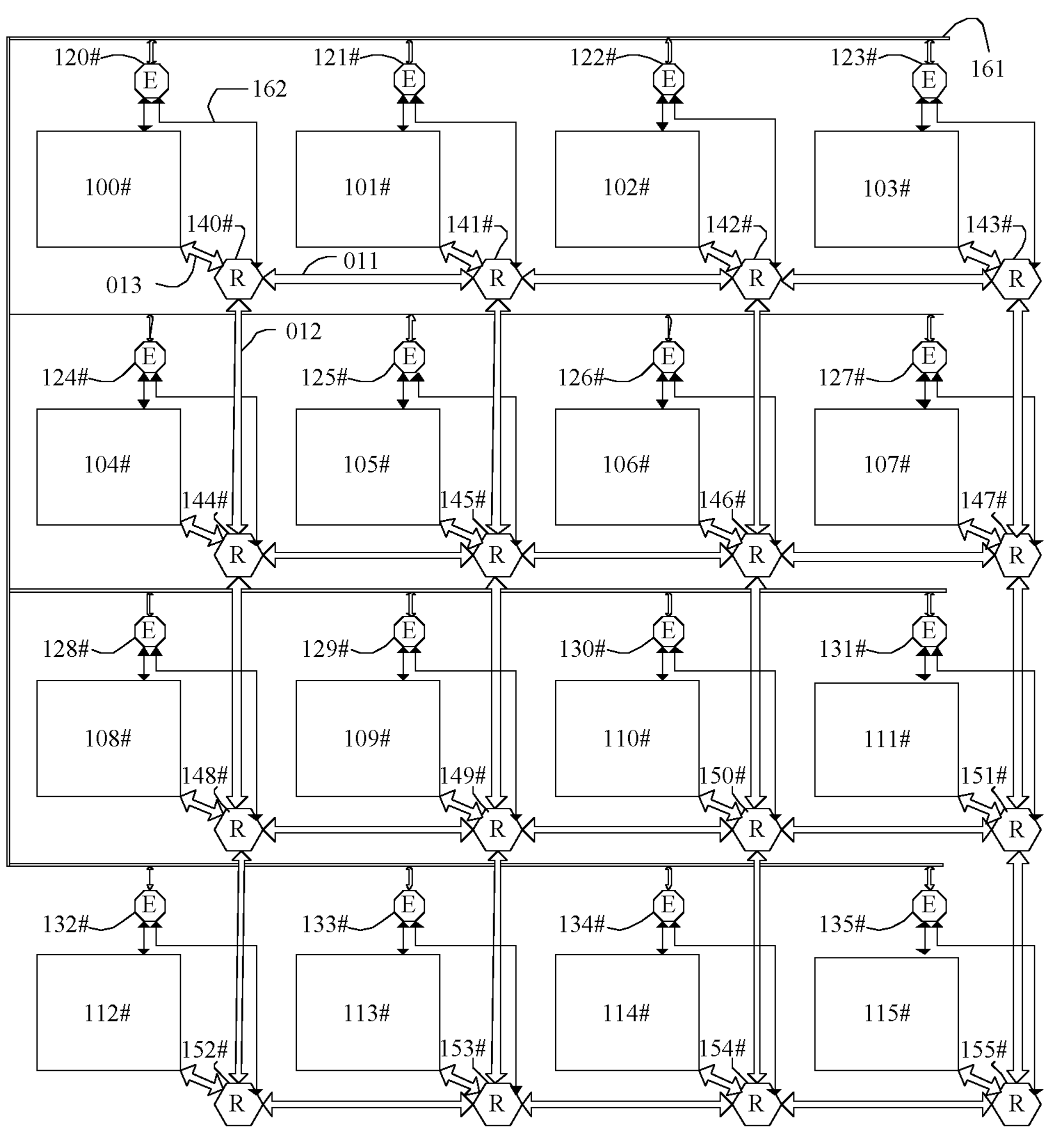
FIG. 1 is an architecture diagram of an embedded-oriented configurable many-core processor according to an embodiment of the present disclosure.

In order to make the purposes, embodiments, and advantages of the disclosure clearer, further detailed description is made below to implementations disclosed by the disclosure with reference to the accompanying drawings.

One of the core ideas of the disclosure is to design a configurable many-core processor (architecture) suitable for an embedded disclosure to achieve the following purposes.

(1) Multiple cores in the many-core processor can achieve good organization. At present, the method of implementing many-core synchronization by means of a synchronous data package is not suitable for the embedded disclosure, for two reasons: first, the transmission of the data package may cause excessive delay and lose the timeliness of synchronization; and second, since the core needs to constantly send, receive and analyze the synchronous data package, the system performance may be degraded. Therefore, it is the core of the patent to establish an event-centered many-core processor synchronization mechanism. Taking a signal line as a carrier, the event is integrated in a processor chip and connected with the cores through a controllable transmission gate. High-level pulses and low-level pulses transmitted on these signal lines are called events, which are predefined signals with special meanings. Each core may send or receive the at least one event. Through the at least one event, the connection among the multiple cores is established. Since a dedicated signal line direct connection manner is employed, the delay is low, and not only one-to-many transmission but also many-to-one transmission may be implemented. A topology is flexible.

(2) Memory resources on the many-core processor chip achieve better adaptability and sharing. At present, a distributed shared memory system is widely used in the many-core processor. In the distributed shared memory system, each core is provided with a private register, a private first-level cache and a second-level cache structure. Here, the second-level cache of each core may be used as a shared third-level cache of another core. In the distributed shared memory system, when one core accesses the shared memory space on another core, the normal execution of the accessed core may be inevitably impacted, and the magnitude and time of the impact are very random. When there are multiple such shared accesses in the many-core processor, the overall execution of the many-core processor may be uncertain, so the many-core processor is not suitable for the embedded disclosure. Therefore, in the on-chip routing system of the many-core processor, a certain amount of memory modules are added to each routing unit. Before the system runs, these memory modules may be divided and combined and belong to different cores. Thus, when a core accesses the shared memory space, the normal execution of other cores is not impacted.

(3) High efficiency of data transmission in the many-core processor chip. For the data transmission, one variable or multiple data may be transmitted, and a piece of data may also be transmitted by DMA. When these types of data transmission are completed in a unified format or protocol on chip, it will undoubtedly not be efficient. Therefore, from the perspective of data transmission efficiency, it is necessary to design a corresponding transmission solution and hardware implementation for each data transmission type, and then integrate different transmission solutions to form an efficient data transmission network of the many-core processor.

In the embodiments of the disclosure, the embedded-oriented configurable many-core processor (architecture) may specifically include: an on-chip data-bus system, an on-chip event-bus system, a data connection line, N routing units and N cores.

The on-chip data-bus system may specifically include: multiple transverse data-bus 011 and multiple vertical data-bus 012. The multiple transverse data-bus 011 and the multiple vertical data-bus 012 are staggered transversely and vertically to form N intersections. One intersection is correspondingly provided with a routing unit, and adjacent routing units are connected by the transverse data-bus 011 or vertical data-bus 012.

The on-chip event-bus system may specifically include: N event control units, an event bus 161 and an event signal line 162.

One core corresponds to one routing unit and one event control unit. Each core of the N cores is connected with the corresponding routing unit through the data connection line 013. On the one hand, each event control unit is connected with the event bus 161, and the each event control unit is connected with the corresponding core and routing unit through the event signal line 162 on the other hand, and the event control unit may be configured to implement signal gating and logical connection between the event bus and the event signal line.

As shown in FIG. 1, description is made through taking N=16 as an example. N=16, which means there are 16 cores (100 # to 115 # cores), 16 event control units (120 # to 135 # event control units) and 16 routing units (140 # to 155 # routing units). Then, a 100 # core is connected with a 120 # event control unit through the event signal line 162, and the 100 # core is connected with the 140 # routing unit through the data connection line 013 (a bidirectional data line).

A 101 # core is connected with a 121 # event control unit through the event signal line 162, and the 101 # core is connected with the 141 # routing unit through the data connection line 013.

A 102 # core is connected with a 122 # event control unit through the event signal line 162, and the 102 # core is connected with the 142 # routing unit through the data connection line 013.

A 103 # core is connected with a 123 # event control unit through the event signal line 162, and the 103 # core is connected with the 143 # routing unit through the data connection line 013.

A 104 # core is connected with a 124 # event control unit through the event signal line 162, and the 104 # core is connected with the 144 # routing unit through the data connection line 013.

A 105 # core is connected with a 125 # event control unit through the event signal line 162, and the 105 # core is connected with the 145 # routing unit through the data connection line 013.

A 106 # core is connected with a 126 # event control unit through the event signal line 162, and the 106 # core is connected with the 146 # routing unit through the data connection line 013.

A 107 # core is connected with a 127 # event control unit through the event signal line 162, and the 107 # core is connected with the 147 # routing unit through the data connection line 013.

A 108 # core is connected with a 128 # event control unit through the event signal line 162, and the 108 # core is connected with the 148 # routing unit through the data connection line 013.

A 109 # core is connected with a 129 # event control unit through the event signal line 162, and the 109 # core is connected with the 149 # routing unit through the data connection line 013.

A 110 # core is connected with a 130 # event control unit through the event signal line 162, and the 110 # core is connected with the 150 # routing unit through the data connection line 013.

A 111 # core is connected with a 131 # event control unit through the event signal line 162, and the 111 # core is connected with the 151 # routing unit through the data connection line 013.

A 112 # core is connected with a 132 # event control unit through the event signal line 162, and the 112 # core is connected with the 152 # routing unit through the data connection line 013.

A 113 # core is connected with a 133 # event control unit through the event signal line 162, and the 113 # core is connected with the 153 # routing unit through the data connection line 013.

A 114 # core is connected with a 134 # event control unit through the event signal line 162, and the 114 # core is connected with the 154 # routing unit through the data connection line 013.

A 115 # core is connected with a 135 # event control unit through the event signal line 162, and the 115 # core is connected with the 155 # routing unit through the data connection line 013.

The 120 # to 135 # event control units are connected with the event bus 161 through the event signal line 162.

A 140 # routing unit is connected with a 141 # routing unit through the transverse data-bus 011, and is connected with the 144 # routing unit through the vertical data-bus 012.

The 141 # routing unit is connected with the 140 # routing unit and a 142 # routing unit through the transverse data-bus 011, and is connected with the 145 # routing unit through the vertical data-bus 012.

The 142 # routing unit is connected with the 141 # routing unit and a 143 # routing unit through the transverse data-bus 011, and is connected with the 146 # routing unit through the vertical data-bus 012.

The 143 # routing unit is connected with the 142 # routing unit through the transverse data-bus 011, and is connected with a 147 # routing unit through the vertical data-bus 012.

The 144 # routing unit is connected with the 140 # routing unit and a 148 # routing unit through the transverse data line 012, and is connected with a 145 # routing unit through the vertical data line 011.

The 145 # routing unit is connected with the 144 # routing unit and a 146 # routing unit through the transverse data-bus 011, and is connected with the 141 # routing unit and a 149 # routing unit through the vertical data-bus 012.

The 146 # routing unit is connected with the 145 # routing unit and the 147 # routing unit through the transverse data-bus 011, and is connected with the 142 # routing unit and a 150 # routing unit through the vertical data-bus 012.

The 147 # routing unit is connected with the 146 # routing unit through the transverse data-bus 011, and is connected with the 143 # routing unit and a 151 # routing unit through the vertical data-bus 012.

The 148 # routing unit is connected with the 149 # routing unit through the transverse data-bus 011, and is connected with the 144 # routing unit and a 152 # routing unit through the vertical data-bus 012.

The 149 # routing unit is connected with the 148 # routing unit and the 150 # routing unit through the transverse data-bus 011, and is connected with the 145 # routing unit and a 153 # routing unit through the vertical data-bus 012.

The 150 # routing unit is connected with the 149 # routing unit and the 151 # routing unit through the transverse data-bus 011, and is connected with the 146 # routing unit and a 154 # routing unit through the vertical data-bus 012.

The 151 # routing unit is connected with the 150 # routing unit through the transverse data-bus 011, and is connected with the 147 # routing unit and a 155 # routing unit through the vertical data-bus 012.

The 152 # routing unit is connected with the 153 # routing unit through the transverse data-bus 011, and is connected with the 148 # routing unit through the vertical data-bus 012.

The 153 # routing unit is connected with the 152 # routing unit and the 154 # routing unit through the transverse data-bus 011, and is connected with the 149 # routing unit through the vertical data-bus 012.

The 154 # routing unit is connected with the 153 # routing unit and the 155 # routing unit through the transverse data-bus 011, and is connected with the 150 # routing unit through the vertical data-bus 012.

The 155 # routing unit is connected with the 154 # routing unit through the transverse data-bus 011, and is connected with the 151 # routing unit through the vertical data-bus 012.

It is to be noted that the transverse data-bus 011, the vertical data-bus 012 and the data connection line 013 are all bidirectional data lines including the input and the output. The event bus 161 is a set of signal lines that transmit signals, each signal line transmits pulse signals representing different meanings, and each pulse signal representing different meanings is called an event.

Cores

Figure 2:
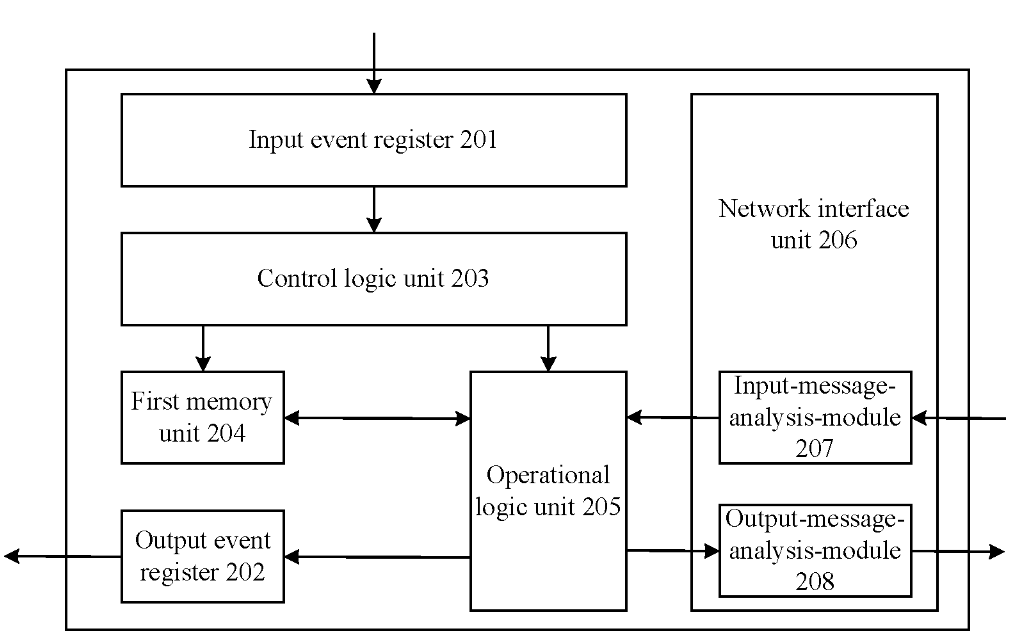
FIG. 2 is a structural diagram of a core according to an embodiment of the present disclosure.

In the embodiment, as shown in FIG. 2, the cores are same in structure and all include: an input event register 201, an output event register 202, a control logic unit 203, a first memory unit 204, an operational logic unit 205 and a network interface unit 206. The network interface unit 206 is matched with the corresponding routing unit of current core. And the network interface unit 206 includes: an input-message-analysis-module 207 and an output-message-analysis-module 208. The input of the input event register 201 is connected with the output of the corresponding event control unit of the current core, and the output of the input event register 201 is connected with the input of the control logic unit 203. The output of the control logic unit 203 being respectively connected with the input of the first memory unit 204 and the input of the operational logic unit 205. The first memory unit 204 is connected with the operational logic unit 205 through the bidirectional data line. The input of the output event register 202 being connected with the output of the operational logic unit 205, and the output of the output event register 202 is connected with the input of the corresponding event control unit of the current core. The input of the input-message-analysis-module 207 is connected with the output of the corresponding routing unit of the current core, and the output of the input-message-analysis-module 207 is connected with the input of the operational logic unit 205. The input of the output-message-analysis-module 208 is connected with the output of the operational logic unit 205, and the output of the output-message-analysis-module 208 is connected with the input of the corresponding routing unit of the current core.

In an embodiment, the input event register 201, configured to register the output of the corresponding event control unit of the current core. The control logic unit 203 is configured to decode an instruction executed by the current core, and generate and output a first control signal for completing each operation to be executed by each instruction. The first memory unit 204 is configured to temporarily store the first control signal and to-be-processed data and/or processed data. The operational logic unit 205, configured to execute corresponding arithmetic operation and/or logic operation based on the output of the control logic unit 203, the output of the input-message-analysis-module 207 and the output of the first memory unit 204, and output an operational result of the arithmetic operation and/or logic operation to the output-message-analysis-module 208, the first memory unit 204 and the output event register 202. The network interface unit 206 is configured to assemble and analyze message data between the current core and the corresponding routing unit. The input-message-analysis-module 207, configured to analyze the message data transmitted through the routing unit, judge whether the message data is a message for the current core, in response to the message data being the message for the current core, remove a header of the message data, obtain effective data by extraction, and send the effective data to the operational logic unit 205. The output-message-analysis-module 208, configured to assemble the operational result output by a operational logic unit 205 according to a specified message format and then output the operational result after assembly to the routing unit. The output event register 202, configured to register the output of the operational logic unit 205.

Event Bus and Event Signal Line

In the embodiment, the event bus 161 include: a set of forward event bus for unidirectional transmission and a set of reverse event bus for unidirectional transmission. The transmission directions of the forward event bus and the reverse event bus are opposite, and the forward event bus and the reverse event bus are respectively composed of K signal lines. The event signal line 162 include: P output event signal lines and Q input event signal lines.

Event Control Unit

In the embodiment, the event control unit include: L output configuration registers, L' input configuration registers and J*(L+L') transmission gates. J transmission gates are a set, totaling (L+L') sets of transmission gates, and a set of transmission gates corresponds to an output configuration register or an input configuration register.

Each output configuration register being respectively connected with control terminals of the J transmission gates in the corresponding set of transmission gates through J leads. Each input configuration register being respectively connected with the control terminals of the J transmission gates in the corresponding set of transmission gates through the J leads. Input terminals of the J transmission gates in the corresponding set of transmission gates of the output configuration register being respectively connected with K signal lines of the forward event bus and K signal lines of the reverse event bus, and output terminals of the J transmission gates in the corresponding set of transmission gates of the output configuration register being respectively connected with a corresponding output event signal lines, that is, J=2K, P=L. The output terminals of the J transmission gates in the corresponding set of transmission gates of the input configuration register being respectively connected with the K signal lines of the forward event bus and the K signal lines of the reverse event bus, and the input terminals of the J transmission gates in the corresponding set of transmission gates of the input configuration register being respectively connected with a corresponding input event signal lines, that is, Q=L'.

Figure 3:
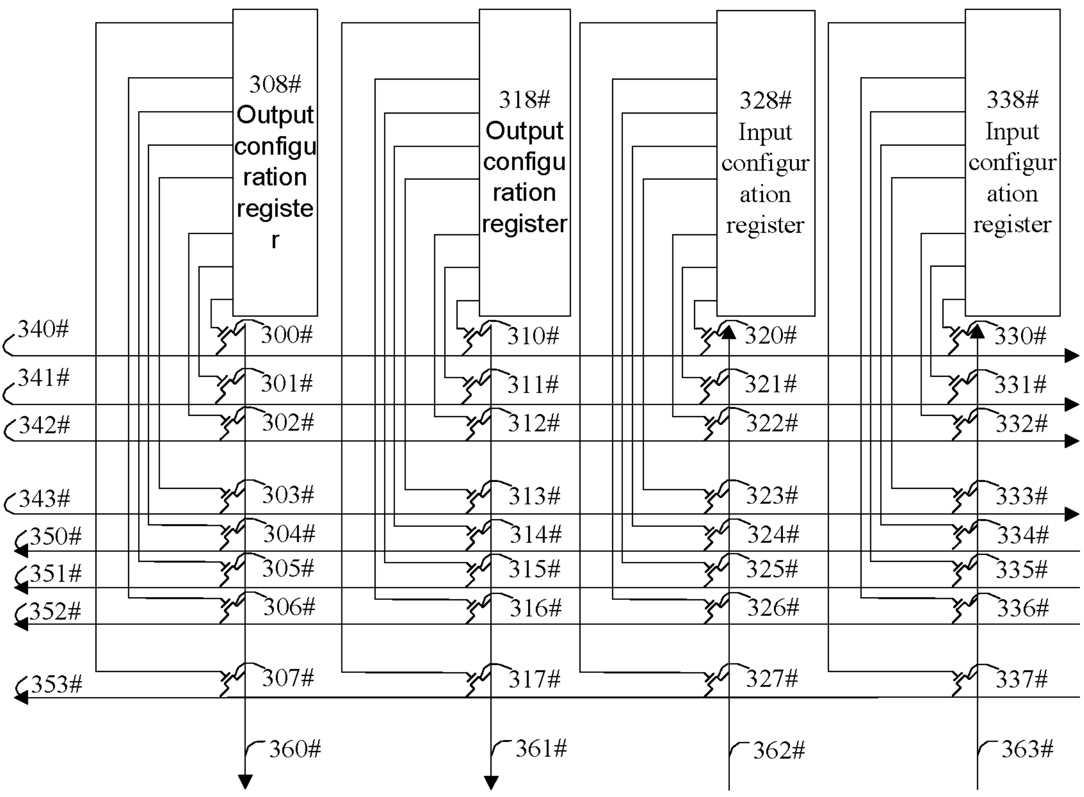
FIG. 3 is a structural diagram of an event control unit according to an embodiment of the present disclosure.

As shown in FIG. 3, description is made by taking L=L'=2, J=8 as an example. That is, the two output configuration registers are: 308 # output configuration register and 318 # output configuration register. The two input configuration registers are: 328 # input configuration register and 338 # input configuration register. The four sets of transmission gates are: 300 # to 307 # transmission gates, 310 # to 317 # transmission gates, 320 # to 327 # transmission gates and 330 # to 337 # transmission gates. The four signal lines corresponding to the forward event bus are: 340 # to 343 # signal lines. The four signal lines corresponding to the reverse event bus are: 350 # to 353 # signal lines. The two output event signal lines are: 360 # output event signal line and 361 # output event signal line. The two input event signal lines are: 362 # input event signal line and 363 # input event signal line. The 308 # output configuration register, the 318 # output configuration register, the 328 # input configuration register and the 338 # input configuration register are all provided with eight leads.

Then, eight leads of the 308 # output configuration register are connected with control terminals of the 300 # to 307 # transmission gates, respectively.

Eight leads of the 318 # output configuration register are connected with control terminals of the 310 # to 317 # transmission gates, respectively.

Eight leads of the 328 # input configuration register are connected with control terminals of the 320 # to 327 # transmission gates, respectively.

Eight leads of the 338 # input configuration register are connected with the control terminals of the 330 # to 337 # transmission gates, respectively.

The input terminals of the 300 # to 307 # transmission gates are respectively connected with the 340 # to 343 # signal lines and the 350 # to 353 # signal lines. The output terminals of the 300 # to 307 # transmission gates are connected together and connected with the 360 # output event signal line.

The input terminals of the 310 # to 317 # transmission gates are respectively connected with the 340 # to 343 # signal lines and the 350 # to 353 # signal lines. The output terminals of the 310 # to 317 # transmission gates are connected together and connected with the 361 # output event signal line.

The output terminals of the 320 # to 327 # transmission gates are respectively connected with the 340 # to 343 # signal lines and the 350 # to 353 # signal lines. The input terminals of the 320 # to 327 # transmission gates are connected together and connected with the 362 # input event signal line.

The output terminals of the 330 # to 337 # transmission gates are respectively connected with the 340 # to 343 # signal lines and the 350 # to 353 # signal lines. The input terminals of the 330 # to 337 # transmission gates are connected together and connected with the 363 # input event signal line.

It is to be noted that, in an example, only two sets of event bus (the forward event bus and the reverse event bus), each set of event bus consisting of four signal lines, two output event signal lines, two input event signal lines, two output configuration registers, two input configuration registers, each output configuration register controlling the opening/closing of eight transmission gates, each input configuration register controlling the opening/closing of the eight transmission gates, etc. are defined. In implementation, the number of sets of event bus, the number of signal lines of each set of event bus, the number of output event signal lines, the number of input event signal lines, the number of output configuration registers, the number of input configuration registers, the number of transmission gates controlled through the output configuration register, and the number of transmission gates controlled through the input configuration register may be further expanded according to an actual situation.

Routing Unit

Figure 4:
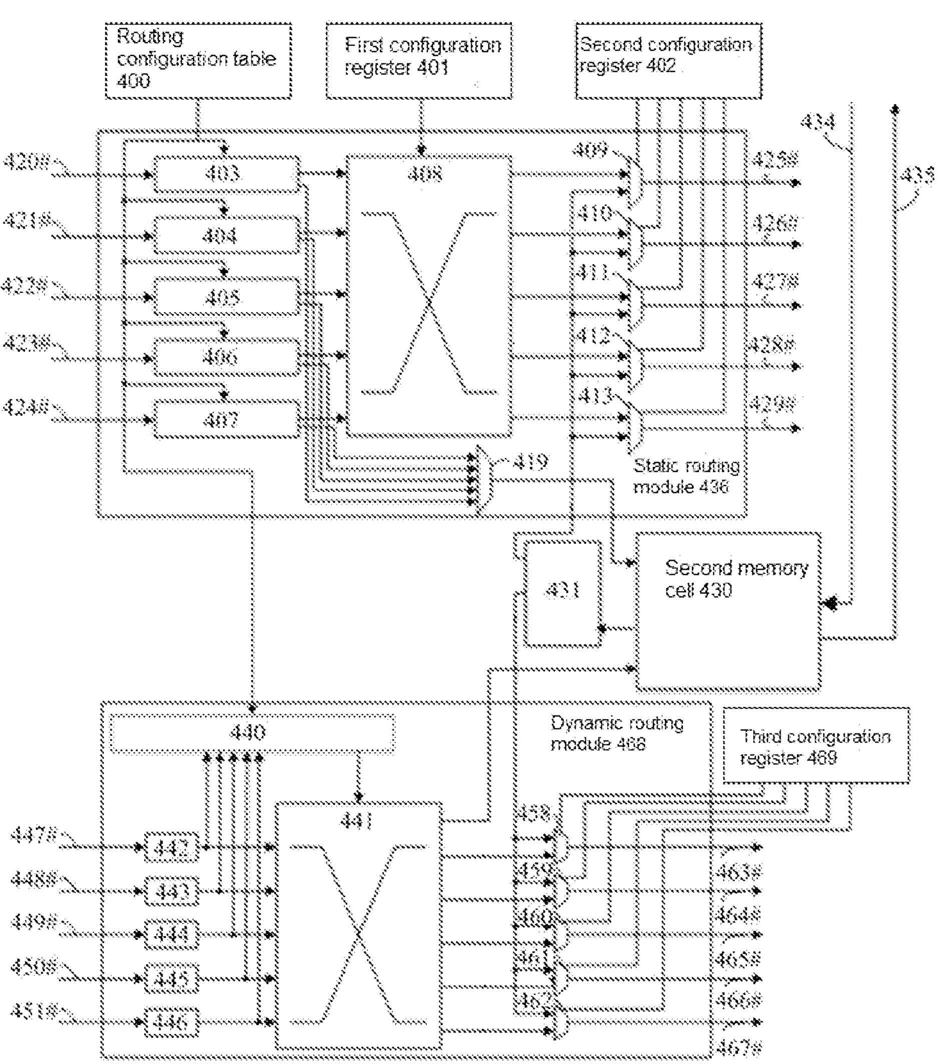
FIG. 4 is a structural diagram of a routing unit according to an embodiment of the present disclosure.

In the embodiment, as shown in FIG. 4, the routing unit include: a routing configuration table 400, a first configuration register 401, a second configuration register 402, a third configuration register 469, a second memory unit 430, a message assembly module 431, a static routing module 436, a dynamic routing module 468, a routing unit input data line, a routing unit output data line, a routing input event signal line 434 and a routing output event signal line 435. The routing unit input data line include: five DMA input data lines (420 # to 424 # DMA input data lines) in up, down, left, right and processor-core directions, and five variable input data lines (447 # to 451 # variable input data lines) in the up, down, left, right and processor-core directions. The routing unit output data line include: five DMA output data lines (425 # to 429 # DMA output data lines) in the up, down, left, right and processor-core directions, and five variable output data lines (463 # to 467 # variable output data lines) in the up, down, left, right and processor-core directions.

The static routing module 436 include: a message analysis module I 403, a message analysis module II 404, a message analysis module III 405, a message analysis module IV 406, a message analysis module V 407, a first crossbar logic unit 408, a multiplexer I 409, a multiplexer II 410, a multiplexer III 411, a multiplexer IV 412, a multiplexer V 413 and a five-way selector 419. The input of each message analysis module being respectively connected with the output of the routing configuration table 400 and a corresponding DMA input data line. The output of each message analysis module being respectively connected with one way of input of the first crossbar logic unit 408 and one way of input of the five-way selector 419. The output of the five-way selector 419 is connected to the input of the second memory unit 430. Five outputs of the first crossbar logic unit 408 being respectively connected with the inputs of the multiplexers I to V. The five DMA output data lines being respectively connected with the outputs of the multiplexers I to V. The output of the first configuration register 401 being connected with the input of the first crossbar logic unit 408. The output of the second configuration register 402 being respectively connected with the control terminals of the multiplexers I to V.

The dynamic routing module 468 include: a message analysis module VI, a first-in-first-out unit I 442, a first-in-first-out unit II 443, a first-in-first-out unit III 444, a first-in-first-out unit IV 445, a first-in-first-out unit V 446, a second crossbar logic unit 441, a multiplexer VI 458, a multiplexer VII 459, a multiplexer VIII 460, a multiplexer IX 461 and a multiplexer X 462. The input of the message analysis module VI is respectively connected with the routing configuration table 400 and the outputs of the first-in-first-out units I to V. The output of the message analysis module VI 440 is connected with the input of the second crossbar logic unit 441. The input of each first-in-first-out unit being respectively connected with a corresponding variable input data line. The output of each first-in-first-out unit being respectively connected with the input of the message analysis module VI 440 and one way of input of the second crossbar logic unit 441. Six ways of outputs of the second crossbar logic unit 441 being respectively connected with the input of the second memory unit 430 and the inputs of the multiplexers VI to X. The five variable output data lines being respectively connected with the outputs of the multiplexers VI to X. The output of the third configuration register 469 is connected with the control terminals of the multiplexers VI to X, respectively.

The output of the message assembly module 431 being respectively connected with the inputs of the multiplexers I to X. The second memory unit 430 being respectively connected with the output of the five-way selector 419, the input of the message assembly module 431, one way of output of the second crossbar logic unit 441, the routing input event signal line 434 and the routing output event signal line 435.

Further, in the embodiment, the static routing module 436, configured to control a DMA data stream transmission path. The dynamic routing module 468, configured to control variable data transmission. The routing configuration table 400, configured to store a correspondence between physical coordinates and logical coordinates of the routing unit, and a correspondence between address space and the logical coordinates of the routing unit, for using in routing arbitration selection. The first configuration register 401, configured to preset the correspondence between the five outputs and the five inputs of the first crossbar logic unit 408. The second configuration register 402 is configured to control output selection of the multiplexers I to V. The message analysis modules I to V are sequential logic modules, configured to analyze the message input to the routing unit to obtain a message analysis result, judge; based on the message analysis result, the type of the message input to the routing unit to determine whether the message input to the routing unit is DMA data stream transmission or DMA variable transmission, judge a destination address of the message input to the routing unit based on the message analysis result and the correspondence stored in the routing configuration table 400 to determine whether the destination address of the message input to the routing unit matches the current routing unit or needs to be continuously transmitted along a route; continuously transmit the message along the route and determine the output connection between the message analysis modules I to V and the first crossbar logic unit to be valid in response to the message input to the routing unit being the DMA data stream and the destination address of the message does not match the current routing unit; and determine the output connection between the message analysis modules I to V and the five-way selector 419 to be valid in response to the message input to the routing unit being the DMA data stream, and the destination address of the message does not match the current routing unit. The first crossbar logic unit 408 is a combinatorial logic module, configured to establish a cross transmission path between the five inputs and the five outputs of the first crossbar logic unit 408. That is, any output of the first crossbar logic unit 408 is capable of communicating with any input. The message analysis module VI is a sequential logic module, configured to analyze the messages output through the first-in-first-out units I to V in sequence based on set priority, output a routing direction arbitration signal, and take the routing direction arbitration signal as the control signal of the second crossbar logic unit 441 to make the messages read by the first-in-first-out units I to V can continue to be transmitted. The second crossbar logic unit 441 is a combinatorial logic module, configured to establish a cross transmission path between the five inputs and the five outputs of the second crossbar logic unit 441. That is, any output of the second crossbar logic unit 441 is capable of communicating with any input. The second memory unit 430, configured to temporarily store the DMA data and variable data input from the up, down, left, right and processor-core directions, and serves as a shared memory for the core to access. The message assembly module 431 is a sequential logic module, configured to assemble the data read from the second memory unit 430 into a message that may be transmitted in the routing unit of the many-core processor according to a set rule and format. The third configuration register 469, configured to control the multiplexers VI to X to perform selection between the message assembly module and one way of output of the second crossbar logic unit 441.

In conclusion, the present disclosure discloses the embedded-oriented configurable many-core processor. Structural configuration (including but not limited to a synchronization relationship of the many-core processor, shared memory space, a data stream transmission path, etc.) may be implemented by multiple configuration registers before the embedded-oriented configurable many-core processor running. Through the structural configuration and internal reshaping of the many-core processor, an optimal matching structure for a current disclosure program is formed, and the purposes of high performance and low power consumption are achieved.

Second, the cores integrated inside the embedded-oriented configurable many-core processor establish direct contact through events to implement a fast synchronization function between the cores. These events may not only represent the validity of incoming data and the end of a processing task, but also represent an external trigger signal, a timer trigger signal, counter trigger signal, etc. The cores can not only send the events, but also receive and judge the events. The cores can not only receive at least one event, but also send at least one event. Since the signal lines carrying the event can span multiple cores and establish a connection among the multiple cores, the synchronization mode is more direct and efficient.

Further, the routing unit inside the embedded-oriented configurable many-core processor integrates the memory unit, and a flexible on-chip distributed shared memory system is formed along with an on-chip routing system. The on-chip distributed shared memory system can support capacity dynamic partitioning and grouping through pre-definition and configuration. Since there is no coupling between the shared memory system and the cores, the impact of accessing the shared memory space on other cores is eliminated. A method of combining software and hardware is adopted, so that the on-chip memory management is flexible, and flexible data layout and reconfigurable local data memory space are implemented.

In addition, the routing unit inside the embedded-oriented configurable many-core processor integrates two functions of static routing supporting DMA data stream transmission and dynamic routing supporting variable transmission to support flexible data movement. The static routing ensures the transmission of a high throughput data stream. During transmission, it is not necessary to judge the routing direction, and transmission is directly performed based on a pre-configured direction. The dynamic routing ensures the transmission of low-delay and lightweight data. During transmission, the routing direction is automatically judged based on a package header, which simplifies the difficulty in development of high-level disclosure software. Since the memory unit is integrated in the routing unit, the static routing may be implemented to write DMA data into the memory unit, and then multicast to different cores through a dynamic routing system, and it can also be realized that the multiple cores write data into the memory unit in the routing unit, and then read the data from the memory unit for transmission through the static routing.

In the embodiment, the many-core processor chip may be designed based on the above-mentioned embedded-oriented configurable many-core processor solution. In the design of the many-core processor chip, there are mainly the following implementations.

(1) In the many-core processor, a two-dimensional grid structure is constructed, and the routing unit is arranged at the intersection of a horizontal transverse bus and a horizontal vertical bus. Each routing unit corresponds to a core, and the core may be either a microprocessor or a Digital Signal Processing (DSP) acceleration engine that performs a present function. Each core corresponds to an event control unit, one terminal of the event control unit is connected with the event bus, and the input/output event at the other terminal is connected with the core and the routing unit. The event bus in the processor is distributed inside the chip, so multiple cores and routing units may share the same event or have independent events. These events, in essence, are pulse signals transmitted in the event bus, which can be sent out by broadcast.

(2) In the many-core processor, a three-dimensional grid structure is constructed, and the routing units are arranged at the intersections of the horizontal transverse bus, the horizontal vertical bus and a perpendicular vertical bus. Each routing unit corresponds to the core, and the core may be either a microprocessor or a DSP acceleration engine that performs the present function. Each core corresponds to an event control unit, one terminal of the event control unit is connected with the event bus, and the input/output event at the other terminal is connected with the core and the routing unit. The event bus in the processor is distributed inside the chip, so multiple cores and routing units may share the same event or have independent events. These events, in essence, are pulse signals transmitted in the event bus, which can be sent out by broadcast.

(3) In the many-core processor, a linear array, a ring topology, a tree topology, a star topology, etc. are constructed, and the routing unit is arranged at each node. Each routing unit corresponds to the core, and the core may be either a microprocessor or a DSP acceleration engine that performs the present function. Each core corresponds to an event control unit, one terminal of the event control unit is connected with the event bus, and the input/output event at the other terminal is connected with the core and the routing unit. The event bus in the processor is distributed inside the chip, so multiple cores and routing units may share the same event or have independent events. These events, in essence, are pulse signals transmitted in the event bus, which can be sent out by broadcast.

(4) The cores and the routing units integrated in the many-core processor have the functions of receiving and sending events. The configuration register establishes a transmission channel of the event through controlling on and off of a gating device. The number of events connected with a processing unit and the routing unit can be one or more. Different events respectively represent different meanings to control the functions of the processing unit and the routing units.

(5) Multiple routing units are integrated in the many-core processor. These routing units are mainly composed of a static routing module capable of transmitting high throughput and DMA data streams and a dynamic routing module that transmits high concurrency and self-addressing. The number of the static routing modules and dynamic routing modules integrated in the routing unit may be one or more. The memory units are integrated in the routing units and can cache the data received by the static routing module or the data received by the dynamic routing module. Under the control of the events, these data are transmitted through the static routing module or the dynamic routing module.

Although the disclosure has been disclosed in above preferred embodiments, the embodiments are not intended to limit the disclosure. Those skilled in the art can make possible changes and modifications to the technical solution of the disclosure by using the methods and technical contents disclosed above without departing from the spirit and scope of the disclosure. Therefore, any simple modifications, equivalent changes and modifications made to the above embodiments according to the technical essence of the disclosure without departing from the content of the technical solution of the disclosure belong to the scope of protection of the technical solution of the disclosure.

What is not described in detail in the description of the disclosure belongs to a publicly-known art of those skilled in the art.

What is claimed is:

1. An embedded-oriented configurable many-core processor, comprising: an on-chip data-bus system, an on-chip event-bus system, a data connection line, N routing units and N cores, the on-chip data-bus system comprises: multiple transverse data-bus and multiple vertical data-bus, wherein the multiple transverse data-bus and the multiple vertical data-bus being staggered transversely and vertically to form N intersections, each intersection of the N intersections being correspondingly provided with a routing unit, and adjacent routing units being connected by transverse data-bus or vertical data-bus;

the on-chip event-bus system comprises: N event control units, an event bus and an event signal line;

one core corresponds to one routing unit and one event control unit, each core of the N cores being connected with the corresponding routing unit through the data connection line, on the one hand, each event control unit being connected with the event bus, and the each event control unit being connected with the corresponding core and routing unit through the event signal line on the other hand, and the event control unit being configured to implement signal gating and logical connection between the event bus and the event signal line;

wherein the event bus comprises: a set of forward event bus for unidirectional transmission and a set of reverse event bus for unidirectional transmission, transmission directions of the forward event bus and the reverse event bus being opposite, and the forward event bus and the reverse event bus being respectively composed of K signal lines; the event signal line comprises: P output event signal lines and Q input event signal lines;

wherein the event control unit comprises: L output configuration registers, L' input configuration registers and a total of J*(L+L') transmission gates arranged into (L+L') sets, wherein each set comprise J transmission gates, and a set of transmission gates corresponding to an output configuration register or an input configuration register;

each output configuration register being respectively connected with control terminals of the J transmission gates in the corresponding set of transmission gates through J leads;

each input configuration register being respectively connected with the control terminals of the J transmission gates in the corresponding set of transmission gates through the J leads;

input terminals of the J transmission gates in the corresponding set of transmission gates of the output configuration register being respectively connected with K signal lines of the forward event bus and the K signal lines of the reverse event bus, output terminals of the J transmission gates in the corresponding set of transmission gates of the output configuration register being respectively connected with corresponding output event signal lines, that is, J=2K, P=L;

the output terminals of the J transmission gates in the corresponding set of transmission gates of the input configuration register being respectively connected with the K signal lines of the forward event bus and the K signal lines of the reverse event bus, the input terminals of the J transmission gates in the corresponding set of transmission gates of the input configuration register being respectively connected with corresponding input event signal lines, that is, Q=L'.

2. The embedded-oriented configurable many-core processor as claimed in claim 1, wherein the transverse data-bus, the vertical data-bus and the data connection line are all bidirectional data lines comprising an input and an output.

3. The embedded-oriented configurable many-core processor as claimed in claim 1, wherein the event bus is a set of signal lines transmitting signals, each signal line transmitting pulse signals representing different meanings, and each pulse signal representing different meanings being called an event.

4. The embedded-oriented configurable many-core processor as claimed in claim 1, wherein the each core of the N cores comprises: an input event register, an output event register, a control logic unit, a first memory unit, an operational logic unit and a network interface unit;

the network interface unit being matched with the corresponding routing unit of the each core of the N cores, and the network interface unit comprises: an input-message-analysis-module and an output-message-analysis-module;

an input of the input event register being connected with an output of the corresponding event control unit of the each core of the N cores, the output of the input event register being connected with the input of the control logic unit;

the output of the control logic unit being respectively connected with the input of the first memory unit and the input of the operational logic unit;

the first memory unit being connected with the operational logic unit through the bidirectional data line;

the input of the output event register being connected with the output of the operational logic unit, the output of the output event register being connected with the input of the corresponding event control unit of the each core of the N cores;

the input of the input-message-analysis-module being connected with the output of the corresponding routing unit of the each core of the N cores, the output of the input-message-analysis-module being connected with the input of the operational logic unit;

the input of the output-message-analysis-module being connected with the output of the operational logic unit, the output of the output-message-analysis-module being connected with the input of the corresponding routing unit of the each core of the N cores.

5. The embedded-oriented configurable many-core processor as claimed in claim 4, wherein, the input event register, configured to register the output of the corresponding event control unit of the each core of the N cores;

the control logic unit, configured to decode an instruction executed by the each core of the N cores, and generate and output a first control signal for completing each operation to be executed by each instruction;

the first memory unit, configured to temporarily store the first control signal and to-be-processed data and/or processed data;

the operational logic unit, configured to execute corresponding arithmetic operation and/or logic operation based on the output of the control logic unit, the output of the input-message-analysis-module and the output of the first memory unit, and output an operational result of the arithmetic operation and/or logic operation to the output-message-analysis-module, the first memory unit and the output event register;

the network interface unit, configured to assemble and analyze message data between the each core of the N cores and the corresponding routing unit;

the input-message-analysis-module, configured to analyze the message data transmitted through the routing unit, judge whether the message data is a message for the each core of the N cores, in response to the message data being the message for the each core of the N cores, remove a header of the message data, obtain effective data by extraction, and send the effective data to the operational logic unit;

the output-message-analysis-module, configured to assemble an operational result output by the operational logic unit based on a specified message format and output the operational result after assembly to the routing unit;

the output event register, configured to register the output of the operational logic unit.

6. The embedded-oriented configurable many-core processor as claimed in claim 1, wherein the routing unit comprises: a routing configuration table, a first configuration register, a second configuration register, a third configuration register, a second memory unit, a message assembly module, a static routing module, a dynamic routing module, a routing unit input data line, a routing unit output data line, a routing input event signal line and a routing output event signal line;

the routing unit input data line comprises: five Direct Memory Access (DMA) input data lines in up, down, left, right and processor-core directions, and five variable input data lines in the up, down, left, right and processor-core directions;

the routing unit output data line comprises: five DMA output data lines in the up, down, left, right and processor-core directions, and five variable output data lines in the up, down, left, right and processor-core directions;

the static routing module comprises: message analysis modules I to V, a first crossbar logic unit, multiplexers I to V and a five-way selector; wherein, the input of each message analysis module being respectively connected with the output of the routing configuration table and a corresponding DMA input data line, the output of each message analysis module being respectively connected with one way of input of the first crossbar logic unit and one way of input of the five-way selector; the output of the five-way selector being connected to the input of the second memory unit; five outputs of the first crossbar logic unit being respectively connected with the inputs of the multiplexers I to V; the five DMA output data lines being respectively connected with the outputs of the multiplexers I to V; the output of the first configuration register being connected with the input of the first crossbar logic unit, and the output of the second configuration register being respectively connected with the control terminals of the multiplexers I to V;

the dynamic routing module comprises: a message analysis module VI, first-in-first-out units I to V, a second crossbar logic unit and multiplexers VI to X; wherein, the input of the message analysis module VI being respectively connected with the routing configuration table and the outputs of the first-in-first-out units I to V, the output of the message analysis module VI being connected with the input of the second crossbar logic unit; the input of each first-in-first-out unit being respectively connected with a corresponding variable input data line, the output of each first-in-first-out unit being respectively connected with the input of the message analysis module VI and one way of input of the second crossbar logic unit; six ways of outputs of the second crossbar logic unit being respectively connected with the input of the second memory unit and the inputs of the multiplexers VI to X; the five variable output data lines being respectively connected with the outputs of the multiplexers VI to X, and the output of the third configuration register being respectively connected with the control terminals of the multiplexers VI to X;

the output of the message assembly module being respectively connected with the inputs of the multiplexers I to X;

the second memory unit being respectively connected with the output of the five-way selector, the input of the message assembly module, one way of output of the second crossbar logic unit, the routing input event signal line and the routing output event signal line.

7. The embedded-oriented configurable many-core processor as claimed in claim 6, wherein the static routing module, configured to control a DMA data stream transmission path;

the dynamic routing module, configured to control variable data transmission;

the routing configuration table, configured to store a correspondence between physical coordinates and logical coordinates of the routing unit, and a correspondence between address space and the logical coordinates of the routing unit, for using in routing arbitration selection;

the first configuration register, configured to preset the correspondence between the five outputs and the five inputs of the first crossbar logic unit;

the second configuration register, configured to control output selection of the multiplexers I to V;

the message analysis modules I to V are sequential logic modules, configured to analyze the message input to the routing unit to obtain a message analysis result, judge; based on the message analysis result, the type of the message input to the routing unit to determine whether the message input to the routing unit is DMA data stream transmission or DMA variable transmission; judge a destination address of the message input to the routing unit based on the message analysis result and the correspondence stored in the routing configuration table to determine whether the destination address of the message input to the routing unit matches the current routing unit or needs to be continuously transmitted along a route; continuously transmit the message along the route and determine the output connection between the message analysis modules I to V and the first crossbar logic unit to be valid in response to the message input to the routing unit being the DMA data stream and the destination address of the message does not match the current routing unit; and determine the output connection between the message analysis modules I to V and the five-way selector to be valid in response to the message input to the routing unit being the DMA data stream, and the destination address of the message does not match the current routing unit;

the first crossbar logic unit is a combinatorial logic module, configured to establish a cross transmission path between the five inputs and the five outputs of the first crossbar logic unit, that is, any output of the first crossbar logic unit being capable of communicating with any input;

the message analysis module VI is a sequential logic module, configured to analyze the messages output through the first-in-first-out units I to V in sequence based on set priority, output a routing direction arbitration signal, and take the routing direction arbitration signal as the control signal of the second crossbar logic unit to make the messages read by the first-in-first-out units I to V can continue to be transmitted;

the second crossbar logic unit is a combinatorial logic module, configured to establish a cross transmission path between the five inputs and the five outputs of the second crossbar logic unit, that is, any output of the second crossbar logic unit being capable of communicating with any input;

the second memory unit, configured to temporarily store the DMA data and variable data input from the up, down, left, right and processor-core directions, and serves as a shared memory for the core to access;

the message assembly module is a sequential logic module, configured to assemble data read from the second memory unit into a message that may be transmitted in the routing unit of the many-core processor based on a set rule and format;

the third configuration register, configured to control the multiplexers VI to X to perform selection between the message assembly module and one way of output of the second crossbar logic unit.

* * * * *